United States Patent
Faig et al.

(10) Patent No.: US 11,502,815 B2
(45) Date of Patent: Nov. 15, 2022

(54) IMPAIRMENT DETECTOR FOR DIGITAL SIGNALS

(71) Applicant: MELLANOX TECHNOLOGIES, LTD., Yokneam (IL)

(72) Inventors: Hananel Faig, Jerusalem (IL); Raanan Ivry, Caesarea (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/189,313

(22) Filed: Mar. 2, 2021

(65) Prior Publication Data
US 2022/0286268 A1    Sep. 8, 2022

(51) Int. Cl.
*H04L 7/00* (2006.01)
*H04B 17/29* (2015.01)

(52) U.S. Cl.
CPC .......... *H04L 7/0054* (2013.01); *H04B 17/29* (2015.01)

(58) Field of Classification Search
CPC .......... H03M 1/00; H03M 1/06; H03M 1/08; H03M 1/10; H03M 1/12; H03M 1/36; H04B 1/10; H04B 17/29; H04L 7/00; H04L 7/0054
USPC ......... 341/110–155; 375/226–233, 316, 350; 455/295, 303
See application file for complete search history.

(56) References Cited

U.S. PATENT DOCUMENTS

| | | | |
|---|---|---|---|
| 7,227,479 B1 | 6/2007 | Chen et al. | |
| 8,558,725 B2 | 10/2013 | Kidambi | |
| 2018/0167080 A1* | 6/2018 | Dyer | H03M 1/08 |
| 2019/0280675 A1* | 9/2019 | Tangudu | H03H 17/0248 |

OTHER PUBLICATIONS

Faig et al., "A Novel CDR-Based Low-Cost Time-Inerleaved-ADC Timing Calibration," Journal of Lightwave Technology, vol. 38, No. 7, pp. 1777-1784, Apr. 1, 2020.

* cited by examiner

*Primary Examiner* — Shawkat M Ali
(74) *Attorney, Agent, or Firm* — Kligler & Associates Patent Attorneys Ltd

(57) ABSTRACT

A signal processing method includes receiving a digital signal including a sequence of samples. For each sample among at least some of the samples, a neighbor-based estimate is calculated over (i) one or more samples that precede the sample in the sequence and (ii) one or more samples that succeed the sample in the sequence, and an error value, indicative of a deviation of the neighbor-based estimate from an actual value of the sample, is calculating. An impairment in the digital signal is estimated based on a plurality of error values calculated for a plurality of the samples.

20 Claims, 3 Drawing Sheets

IMPAIRMENT DETECTOR FOR DIGITAL SIGNALS

FIELD OF THE INVENTION

The present invention relates generally to digital signal processing, and particularly to methods and systems for estimating impairments in digital signals.

BACKGROUND OF THE INVENTION

Digital signals produced in electronic circuitry may contain various types of impairments, such as gain mismatch, timing skew or DC offset. Impairments of this sort are encountered, for example, in Analog-to-Digital Converters (ADCs), and in particular Time-Interleaved ADCs (TI-ADCs).

Various techniques for correcting such impairments have been considered in the art. For example, Faig et al. describe techniques for calibrating timing mismatch between sub-ADCs of a TI-ADC, in "A Novel CDR-Based Low-Cost Time-Interleaved-ADC Timing Calibration," Journal of Lightwave Technology, Vol. 38, No. 7, Apr. 1, 2020, pages 1777-1784.

As another example, U.S. Pat. No. 8,558,725 describes a gain and phase calibration method for a TI-ADC. In an embodiment, the TI-ADC uses a digital filter to remove sampling-frequency symmetries. The filtering depending upon expected aliasing characteristics of the input signal. As yet another example, U.S. Pat. No. 7,227,479 describes techniques for background calibration of a TI-ADC.

SUMMARY OF THE INVENTION

A signal processing method includes receiving a digital signal including a sequence of samples. For each sample among at least some of the samples, a neighbor-based estimate is calculated over (i) one or more samples that precede the sample in the sequence and (ii) one or more samples that succeed the sample in the sequence, and an error value, indicative of a deviation of the neighbor-based estimate from an actual value of the sample, is calculating. An impairment in the digital signal is estimated based on a plurality of error values calculated for a plurality of the samples.

In an embodiment, calculating the neighbor-based estimate includes calculating a weighted average of the one or more samples that precede the sample in the sequence and the one or more samples that succeed the sample. In a disclosed embodiment, calculating the neighbor-based estimate includes applying a digital filter having a null coefficient at a position corresponding to the sample.

In an example embodiment, estimating the impairment includes estimating a DC offset by averaging the error values. In another embodiment, estimating the impairment includes estimating a gain mismatch by averaging absolute-values of the error values.

In yet another embodiment, estimating the impairment includes estimating a timing skew based on the error values and on respective time-derivatives of the digital signal. In various embodiments, estimating the timing skew may include one of: averaging the error values multiplied by the respective time-derivatives of the digital signal, averaging the error values multiplied by respective signs of the time-derivatives of the digital signal, averaging signs of the error values multiplied by respective signs of the time-derivatives of the digital signal, and averaging the signs of the error values multiplied by the respective time-derivatives of the digital signal.

In some embodiments, the digital signal is produced by a Time-interleaved Analog-to-Digital Converter (TI-ADC) including multiple component-ADCs, and estimating the impairment includes estimating multiple impairments of the multiple component-ADCs.

In an embodiment, the method further includes digitally correcting the digital signal to reduce the impairment. In another embodiment, the method further includes outputting a correction signal, and controlling an upstream component using the correction signal to reduce the impairment.

In some embodiments, estimating the impairment includes estimating, for each error value, a respective frequency of the digital signal in a time interval containing the error value, and estimating the impairment based on the error values and respective frequencies.

There is additionally provided, in accordance with an embodiment of the present invention, a signal processing apparatus including an input interface and an impairment estimator. The input interface is configured to receive a digital signal including a sequence of samples. The impairment estimator is configured to calculate, for each sample among at least some of the samples, a neighbor-based estimate over (i) one or more samples that precede the sample in the sequence and (ii) one or more samples that succeed the sample in the sequence, to calculate, for each sample among the at least some of the samples, an error value indicative of a deviation of the neighbor-based estimate from an actual value of the sample, and to estimate an impairment in the digital signal based on a plurality of error values calculated for a plurality of the samples.

The present invention will be more fully understood from the following detailed description of the embodiments thereof, taken together with the drawings in which:

DETAILED DESCRIPTION OF EMBODIMENTS

Overview

Figure 1:
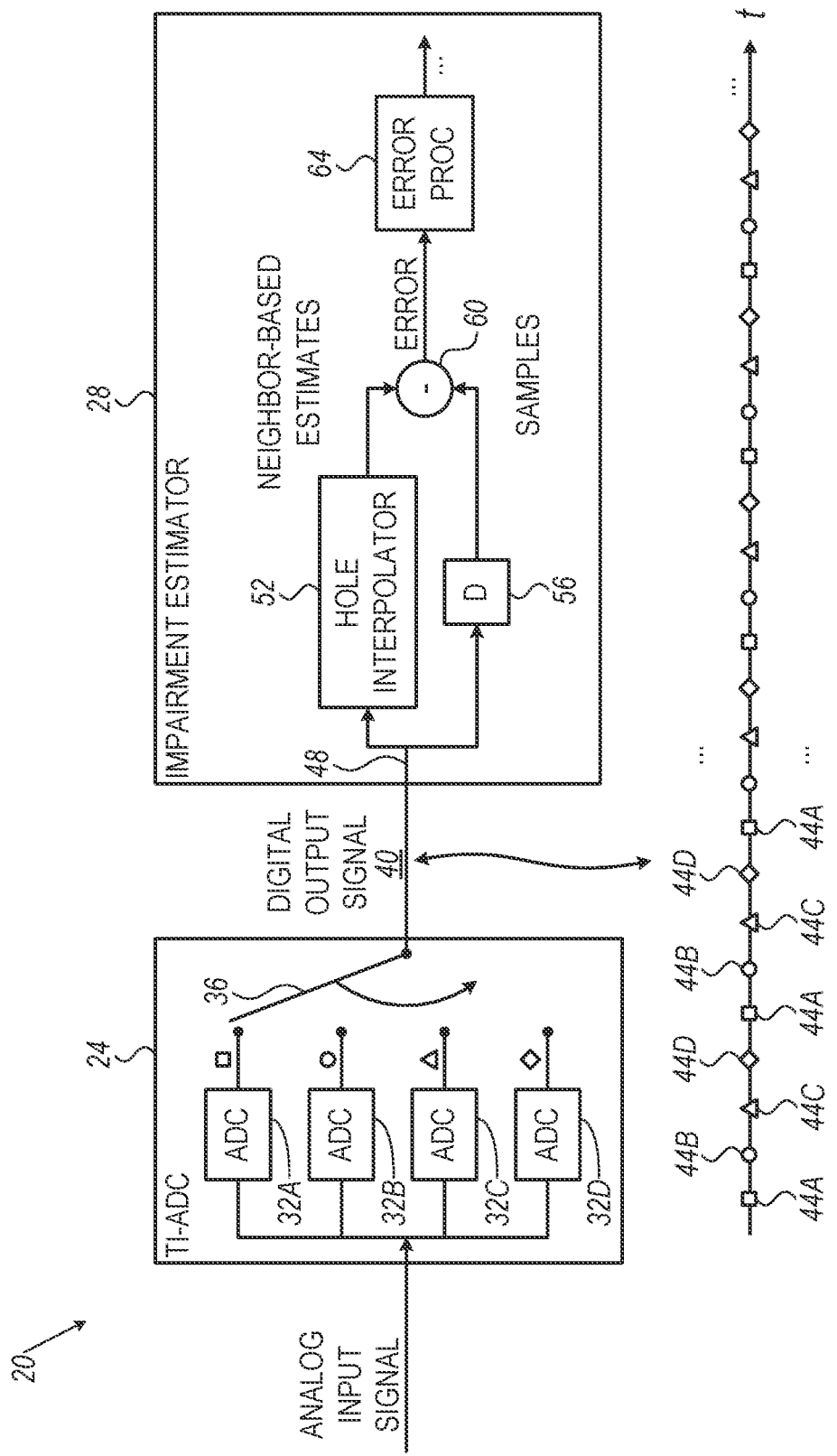
FIG. 1 is a block diagram that schematically illustrates a signal-processing system comprising a TI-ADC and an impairment estimator, in accordance with an embodiment of the present invention.

Embodiments of the present invention that are described herein provide improved methods and systems for estimating impairments in digital signals. The embodiments described herein refer mainly to impairments in a digital signal that is produced by a Time-Interleaved Analog-to- Digital Converter (TI-ADC). This use-case, however, is chosen purely by way of example. The disclosed techniques are applicable in a wide variety of use-cases and applications.

In some embodiments, an impairment estimator receives a digital signal comprising a sequence of samples, and estimates one or more impairments in the digital signal using a signal-processing technique that is referred to herein as "hole interpolation". The impairments may comprise, for example, gain mismatch, DC offset and/or timing skew.

Consider a given sample in the sequence. In some embodiments, the impairment estimator calculates a "neighbor-based estimate" for this sample depending on (i) one or more samples that precede the sample in the sequence and (ii) one or more samples that succeed the sample in the sequence. The neighbor-based estimate of a given sample thus depends on neighboring samples, but not on the given sample itself. The impairment estimator then calculates an "error value" that is indicative of the deviation of the neighbor-based estimate from the actual value of the sample. For example, the impairment estimator may calculate the error value by subtracting the neighbor-based estimate from the actual value of the sample.

The process of calculating neighbor-based estimates and error values is repeated for a plurality of samples in the digital signal, to produce a plurality of error values. The impairment estimator estimates an impairment in the digital signal based on the plurality of error values. Various estimators can be defined based on the error values, for estimating various types of impairments.

The above-described technique is referred to as "hole interpolation" because, in some embodiments, the impairment estimator calculates the neighbor-based estimates by filtering the digital signal with a Finite Impulse Response (FIR) digital filter having a null middle coefficient. The error values are then calculated by subtracting the filtered digital signal from the original digital signal (with proper time alignment between them).

In various embodiments, the impairment estimator may use various estimators that depend on the above-described error values. For example, averaging multiple error values yields an estimator that is indicative of a DC offset in the digital signal; and averaging the absolute-values of multiple error values yields an estimator that is indicative of gain mismatch. As another example, timing skew may be estimated by considering both the error values and the corresponding slopes (time-derivatives) of the digital signal. Several example estimators are described. Estimation of frequency-dependent impairments, i.e., impairments that vary across the signal bandwidth, is also addressed.

System Description

FIG. 1 is a block diagram that schematically illustrates a signal-processing system 20 comprising a TI-ADC 24 and an impairment estimator 28, in accordance with an embodiment of the present invention. Impairment estimator 28 is configured to estimate various impairments in a digital signal produced by TI-ADC 24, using techniques that are described in detail below.

TI-ADC 24 receives an analog input signal for sampling (digitization) at a certain total sampling rate. TI-ADC 24 comprises a bank of ADCs 32, also referred to as "component ADCs" or "sub-ADCs". The component ADCs operate in parallel and with a relative time stagger, with each component ADC 32 sampling the analog input signal at a fraction of the total sampling rate. In the present example TI-ADC 24 comprises four component ADCs denoted 32A-32D, each sampling the analog input signal at a quarter of the total sampling rate. Generally, however, any suitable number of ADCs can be used. TI-ADC 24 further comprises a multiplexer 36 that multiplexes the outputs of ADCs 32A-32D in cyclic alternation.

The output of multiplexer 36, and of TI-ADC 24 as a whole, comprises a digital output signal 40 at the total sampling rate. As illustrated at the bottom of the figure, digital signal 40 comprises a sequence of samples 44, which are produced by time-interleaving the outputs of the four component ADCs 32A-32D. In the present example, the samples denoted 44A were acquired by ADC 32A, the samples denoted 44B were acquired by ADC 32B, the samples denoted 44C were acquired by ADC 32C, and the samples denoted 44D were acquired by ADC 32D. Each sample 44 is marked graphically in the figure with the same icon as the corresponding component ADC 32 that acquired it.

As seen in the figure, a given sample 44 in signal 40 may originate from one of four different hardware paths in TI-ADC 24, depending on the component ADC 32 that sampled it. Each hardware path begins at the input of TI-ADC 24, then splits to a certain ADC 32, traverses a certain input of multiplexer 36, and re-joins the output of the TI-ADC. In practice, the four hardware paths may differ from one another, e.g., in DC, gain and/or timing.

As such, samples 44A (referring to the bottom of FIG. 1) may be characterized by certain values of DC offset, gain mismatch and/or timing skew; samples 44B may be characterized by different values of these impairments; samples 44C may be characterized by yet other values of impairments; and so may samples 44D. Such relative differences between impairments of different hardware paths degrade the sampling accuracy of TI-ADC 24. In some embodiments, impairment estimator 28 estimates these impairments and facilitates their correction.

In some embodiments, impairment estimator 28 receives digital signal 40 via an input interface 48. Impairment estimator 28 further comprises a "hole interpolator" 52, a delay 56, a subtractor 60 and an error processing module 64.

In an embodiment, hole interpolator 52 filters signal 40 with a Finite Impulse Response (FIR) digital filter having a null middle coefficient (i.e., a middle coefficient equal to zero). The FIR filter may comprise, for example, the coefficients {−0.25, 0.75, 0, 0.75, −0.25}. Let the samples of signal 40 be denoted $S_1, S_2, S_3, \ldots$ . When filtering sample $S_n$, the output of the filter is equal to $(-0.25) \cdot S_{(n-2)} + (0.75) \cdot S_{(n-1)} + (0.75) \cdot S_{(n+1)} + (-0.25) \cdot S_{(n+2)}$.

The specific filter response above, and the specific implementation of interpolator 52, are given purely by way of example. More generally, the output of hole interpolator 52, for a given sample of signal 40, is a "neighbor-based estimate" that is calculated over multiple "neighboring samples". The neighboring samples comprise both (i) one or more samples that precede the given sample in the signal and (ii) one or more samples that succeed the given sample in the signal.

When interpolator 52 is implemented by a FIR filter, the neighbor-based estimate comprises a weighted average of the neighboring samples. Alternatively, however, interpolator 52 may calculate the neighbor-based estimate using various other functions, not necessarily linear, of the neighboring samples. Although in the present example the neighboring samples are immediate neighbors of the sample being estimated, interpolator 52 is not limited to the use of immediate neighbors. Moreover, the weighting of the neighboring samples is not necessarily symmetrical with respect to the sample being estimated. Interpolator 52 may calculate the neighbor-based estimate over any suitable number of neighboring samples.

As can be appreciated from the above description, the neighbor-based estimate of a given sample depends on preceding and succeeding neighboring samples, but not on the given sample itself.

In an embodiment, delay 56 delays signal by the same delay as interpolator 52, so that both inputs of subtractor 60 (the neighbor-estimates arriving from interpolator 52 and the original samples arriving from delay 56) are time aligned. Subtractor 60 outputs, per sample of signal 40, the difference between the neighbor-based estimate of the sample and the actual value of the sample. This difference is used as an error value that is indicative of the impairments in signal 40.

More generally, the disclosed techniques are not limited to an arithmetic differences and subtraction operations. Alternatively, impairment estimator 28 may calculate the error values as any other suitable kind of deviation of the neighbor-based estimates of the samples from the respective actual values of the samples.

In some embodiments, error processing module 64 receives the error values for multiple samples of signal 40, and uses the error values to estimate one or more impairments in signal 40. The output of module 64 may comprise, for example, one or more of the following:

An estimated DC offset per component ADC 32, relative to the DC level of signal 40 as a whole.

An estimated gain mismatch per component ADC 32, relative to the gain of signal 40 as a whole.

An estimated timing skew per component ADC 32, relative to the sampling timing of signal 40 as a whole.

Examples of specific estimators that produce such estimates are addressed in detail further below.

Figure 2:
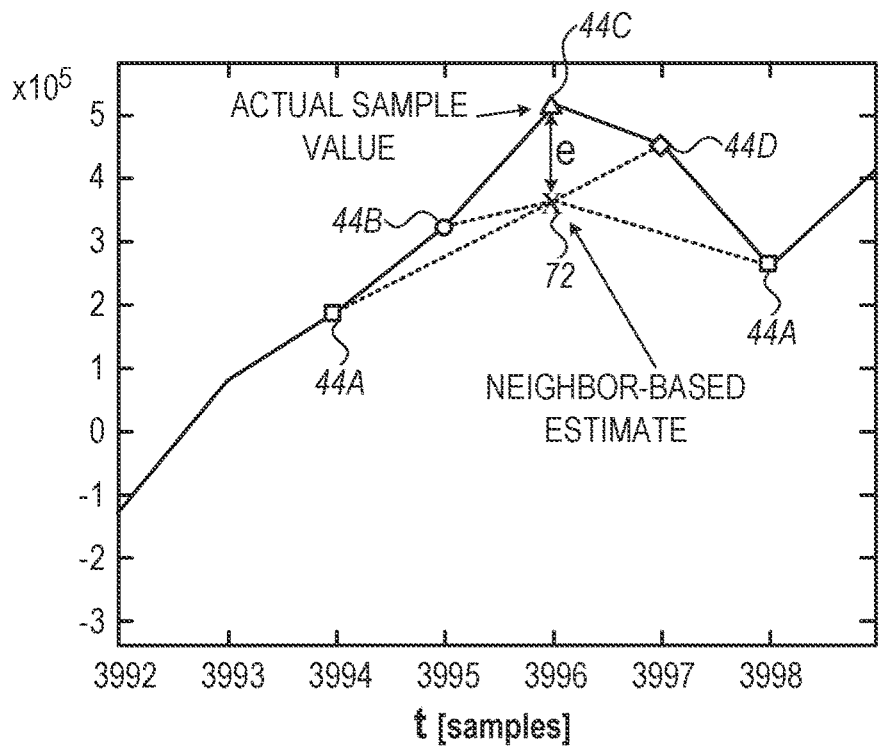
FIG. 2 is a graph showing error estimation using hole interpolation, in accordance with an embodiment of the present invention.

FIG. 2 is a graph that demonstrates the process of error estimation using hole interpolation, in accordance with an embodiment of the present invention. The vertical axis gives the values (magnitudes) of various signals in impairment estimator 28. The horizontal axis is a time axis, in units of sample index. The figure focuses on the error estimation operation for a particular sample (sample index=3996).

A curve 68 plots the values of samples 44 of digital signal 40, as provided at the output of delay 56 (at the bottom input to subtractor 60) over a certain time interval before and after the sample in question (sample index=3996). An X mark 72 denotes a neighbor-based estimate that is output by hole interpolator 52 (provided to the top input to subtractor 60) based on two samples that precede the sample being estimated and two samples that succeed the sample being estimated. The four sample values used in the calculation are shown connected with dashed lines to neighbor-based estimate 72.

In the present example, neighbor-based estimate 72 is lower than the actual sample value. The difference between the two, denoted "e" in the figure, is the error value produced by subtractor 60. Error processing module 64 uses multiple such error values, calculated for different samples of signal 40, for estimating various impairments in the signal.

Figure 3:
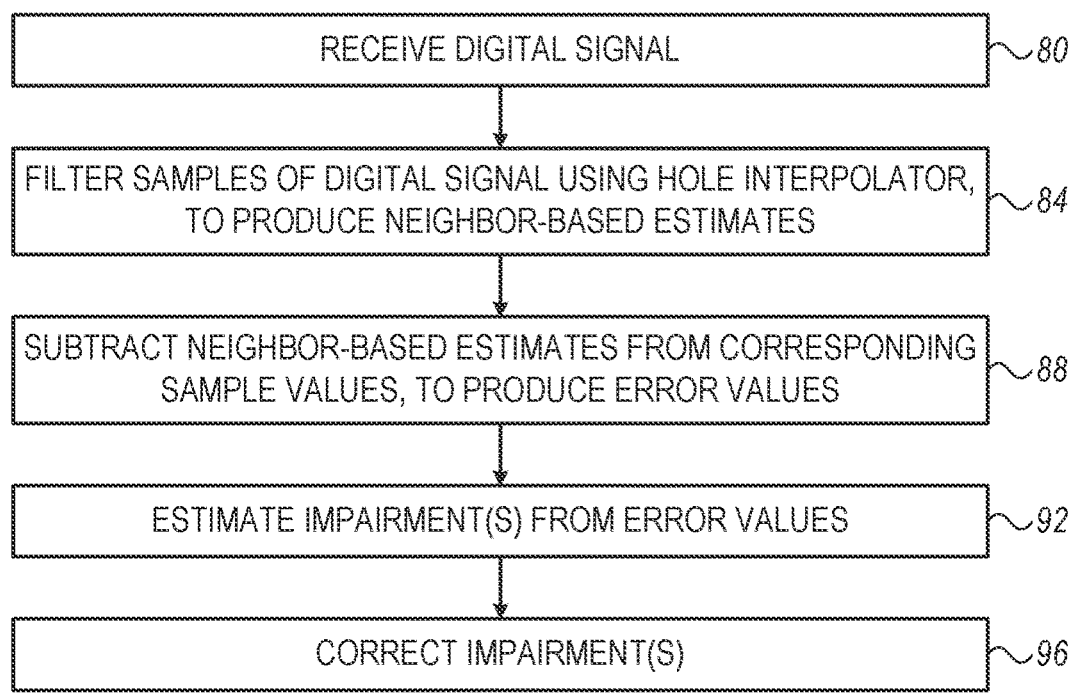
FIG. 3 is a flow chart that schematically illustrates a method for estimating and correcting impairments in a digital signal, in accordance with an embodiment of the present invention.

FIG. 3 is a flow chart that schematically illustrates a method for estimating and correcting impairments in a digital signal, in accordance with an embodiment of the present invention. The method begins with impairment estimator 28 receiving digital input signal 40 via interface 48, at an input step 80. At a filtering step 84, hole interpolator 52 filters signal 40 to produce a stream of neighbor-based estimates. In parallel, delay 56 delays signal 40 to compensate for the delay of hole interpolator 52.

At an error calculation step 88, subtractor 60 subtracts each neighbor-based estimate from the actual value of the respective sample being estimated, to produce a stream of error values. At an impairment estimation step 92, error processing module 64 estimates one or more impairments in signal 40 based on the stream of error values.

At an impairment correction step 96, impairment estimator 28 corrects the estimated impairments, or controls some external circuitry to correct the estimated impairments. Any suitable correction scheme can be used—The specific manner in which the correction is performed is outside the scope of the present disclosure. In some embodiments the correction is applied digitally to signal 40. In other embodiments the correction is applied by generating one or more correction signals (digital or analog) and controlling one or more upstream components using the correction signals to reduce the impairments. For example, referring to system 20 of FIG. 1, correction signals can be fed back from impairment estimator 28 to TI-ADC 24, for adjusting the DC offsets, gains and/or sampling times of ADCs 32A-32D and/or their respective hardware paths.

DC Offset, Gain Mismatch and Timing Skew Estimators Based on Hole Interpolation

In various embodiments, error processing module 64 may use various techniques for estimating various types of impairments in signal 40 using the stream of error values received from subtractor 60. In the description that follows, the error values are given by $$e(i)=Y_{actual}(i)-Y_{estimated}(i)$$

wherein $Y_{actual}(i)$ denotes the actual value of the $i^{th}$ sample 44 in signal 40 (the output of delay 56), and $Y_{estimated}(i)$ denotes the neighbor-based estimate of the same sample (the corresponding output of hole interpolator 52).

In one embodiment, error processing module 64 estimates a DC offset in a given component ADC 32 by calculating an average of multiple error values for samples originating from this component ADC. This estimator can be written as $E[e(i)]$. This estimate is indicative of the DC offset in the given component ADC relative to the DC level of signal 40 as a whole.

In another embodiment, error processing module 64 estimates a gain mismatch in a given component ADC 32 (relative to the gain of signal 40 as a whole) by averaging the absolute-values of multiple error values for samples originating from this component ADC. This estimator can be written as $E[|e(i)|]=E[e(i) \cdot sign(e(i))]$.

In yet other embodiments, error processing module 64 estimates a timing skew in a given component ADC 32 (relative to the sampling timing of signal 40 as a whole) based on the error values $e(i)$ and on the corresponding estimated slopes (time-derivatives) of signal 40. Module 64 may estimate the slope of signal 40 at the $i^{th}$ sample by evaluating any of the following expressions, for example:

$$slope(i)=Y_{actual}(i)-Y_{actual}(i-1)$$

$$slope(i)=Y_{actual}(i+1)-Y_{actual}(i)$$

$$slope(i)=Y_{actual}(i+1)-Y_{actual}(i-1)$$

Module 64 may estimate the timing skew by evaluating any of the following expressions, for example:

$$E[e(i) \cdot slope(i)]$$

$E[e(i) \cdot \text{sign}(\text{slope}(i))]$ $E[\text{sign}(e(i)) \cdot \text{sign}(\text{slope}(i))]$ $E[\text{sign}(e(i)) \cdot \text{slope}(i)]$ Note that in the examples above, the averaging of error values is performed over the samples originating from a particular component ADC 32 (e.g., every fourth error value provided to module 64). Each individual error value, however, (as well as the signal slope) is calculated using neighboring samples that may originate from any of the component ADCs.

The estimators described above are chosen purely by way of example. In alternative embodiments, error processing module 64 may estimate any other suitable type of impairment, or multiple impairments, using any other suitable estimator or estimators.

Figure 4:
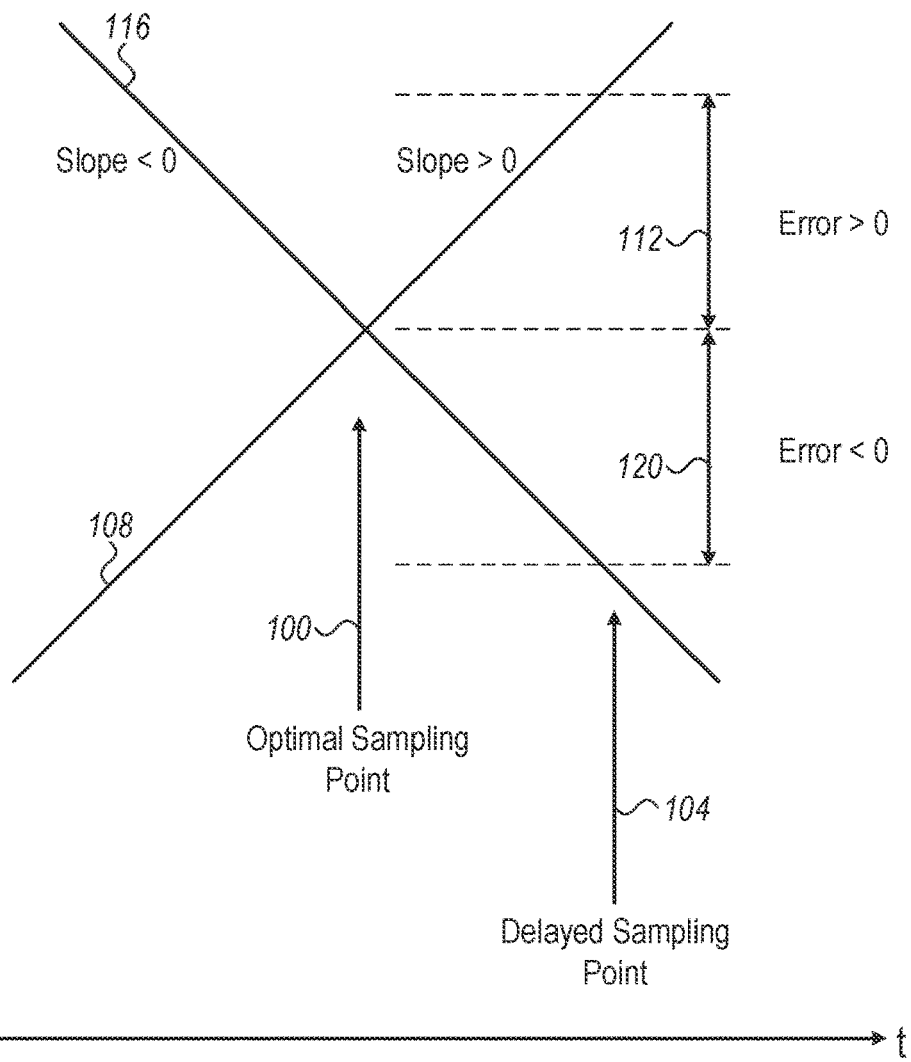
FIG. 4 is a diagram that schematically illustrates estimation of sampling-time error, in accordance with an embodiment of the present invention.

FIG. 4 is a diagram that schematically illustrates estimation of sampling-time error, in accordance with an embodiment of the present invention. The figure demonstrates the use of the signal slope in estimating timing skew.

The horizontal axis in FIG. 4 is a time axis, and the vertical axis in a signal magnitude axis. A time 100 marks the optimal sampling time for a certain component ADC being evaluated. A time 104 marks the actual sampling point of this ADC, which is delayed relative to the desired optimal sampling point.

In such a case, the desired estimator of the timing skew should be a positive value that is proportional to the time delay between time 100 and time 104. The error value e(i), however, may be positive or negative depending on the slope of signal 40 (the value of slope(i)) in the vicinity of times 100 and 104.

In a first possible scenario, slope(i) is positive, as shown by a line 108. The resulting error value e(i), as marked by an arrow 112, is positive. In a second possible scenario, slope(i) is negative, as shown by a line 116. The resulting error value e(i), as marked by an arrow 120, is negative. in both scenario, on estimator of the form $E[e(i) \cdot \text{slope}(i)]$ yields the desired result—a positive value that is proportional to the time delay between time 100 and time 104. This estimator also yields the desired result in scenarios where the actual sampling point lags behind the optimal sampling point. The correctness of the other timing-skew estimators listed above can be demonstrated in a similar manner.

Note that in the example of FIG. 4, the possible signal slopes (lines 108 and 116) are represented as linear curves, i.e., linear approximations of the slope that are derived from two data-points of the signal. This approximation is chosen purely by way of example. In alternative embodiments, the slope can be approximated in any other way and using any suitable number of data-points.

Estimation of Frequency-Dependent Impairments

In some practical cases, an impairment (e.g., DC offset, gain or timing skew) may be frequency-dependent, i.e., may vary across the bandwidth of digital signal 40. In some embodiments of the present invention, the impairment estimator handles frequency-dependent impairments by estimating the error values e as a function of frequency.

Figure 5:
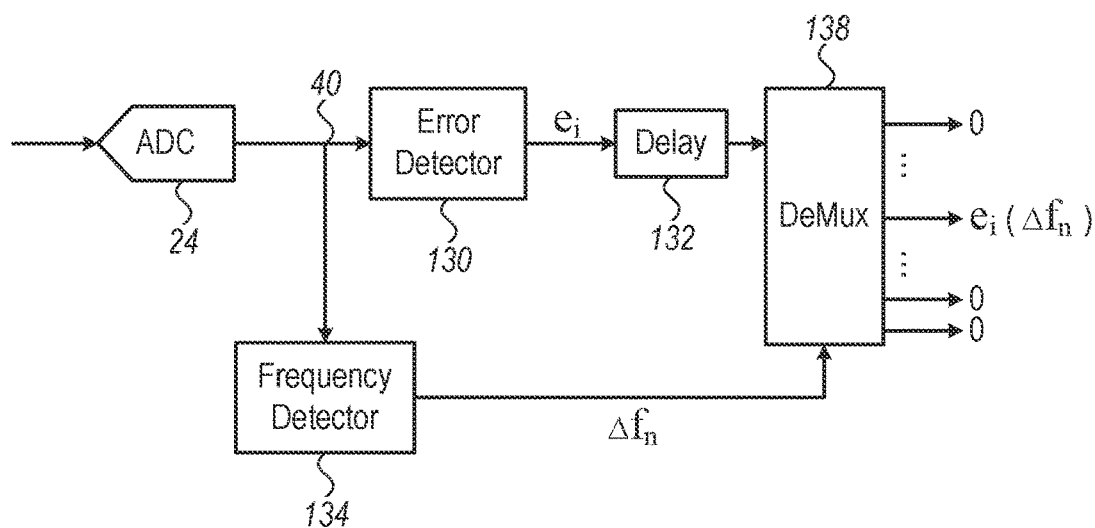
FIG. 5 is a block diagram that schematically illustrates an impairment estimator for estimation of frequency-dependent impairments, in accordance with an embodiment of the present invention.

FIG. 5 is a block diagram that schematically illustrates an impairment estimator for estimation of frequency-dependent impairments, in accordance with an embodiment of the present invention. In the present example the impairment estimator is coupled to ADC 24, but the disclosed technique is applicable to any other suitable source of digital signal 40.

In the embodiment of FIG. 5, the impairment estimator comprises a hole-interpolation based error detector 130, a delay 132, a frequency detector 134 and a de-multiplexer (DeMux) 138.

Error detector 130 may comprise, for example, hole interpolator 52, delay 56 and subtractor 60 as in FIG. 1 above. The output of error detector 130 is thus a stream of error values denoted $e_i$.

In parallel to the operation of error detector 130, the samples of digital signal 40 are provided to frequency detector 134. In the present example digital signal 40 is assumed to be confined to a known bandwidth that is divided into multiple frequency slices denoted $\Delta f_n$, n=1 . . . N. Frequency detector 134 analyzes time intervals of signal 40. Each time interval comprises multiple samples. The time intervals may be successive (disjoint) or partly overlapping. For each time interval, frequency detector 134 identifies the frequency slice $\Delta f_n$ in which the signal falls, or more generally the frequency slice that most closely matches the frequency of the signal during the time interval. Frequency detector 134 then outputs the index n or other identifier of the identified frequency slice.

DeMux 138 has a data input, a selector control input, and multiple outputs corresponding to the multiple frequency slices $\Delta f_n$. The stream of error values $e_i$ is provided to the data input after being delayed by delay 132, and the identified frequency slices $\Delta f_n$ are provided to the selector control input of the DeMux. In this manner, each error value $e_i(\Delta f_n)$ exits the DeMux on the output that corresponds to its estimated frequency slice. Therefore, a subsequent error processing module (e.g., module 64 of FIG. 1) may estimate the impairment (e.g., DC offset, gain and/or timing skew) separately per frequency slice, and apply frequency-dependent corrections to mitigate the impairment.

The system configurations, impairment estimator configurations and TI-ADC configuration, shown in FIGS. 1 and 5, are example configurations that are depicted purely for the sake of conceptual clarity. Any other suitable configurations can be used in alternative embodiments.

The various system elements shown in FIGS. 1 and 5 may be implemented using suitable hardware, such as in one or more Application-Specific Integrated Circuits (ASIC) or Field-Programmable Gate Arrays (FPGA). The various system elements may be implemented using hardware, using software, or using a combination of hardware and software elements.

In some embodiments, some or even all of the functions of the disclosed impairment estimators may be implemented in a general-purpose processor, e.g., a Digital Signal Processor (DSP), which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address estimation and correction of impairments in digital signals that are produced by TI-ADCs, the methods and systems described herein can also be used in other applications. One such example is an Automatic Gain Control (AGC) circuit that precedes an ADC and is configured to set the gain of the analog signal at the ADC input. The disclosed "hole interpolation" technique can be used to identify clipped samples (samples whose magnitude exceeds the full-scale value of the ADC) in the sampled digital signal, estimate error values that are indicative of the severity of the clipping, and adjust the AGC gain depending on the error values.

The disclosed techniques can be used in any suitable system, application or use-case that involves reception and processing of a digital signal. One example use-case is in a port of a network device, such as a network adapter or packet switch, which receives digital signals that convey communication packets. Another use-case is a bus or other input interface of a processor, e.g., a CPU or GPU, which receives digital signals. Generally, however, the disclosed technique is not limited to any specific application or host system.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A signal processing method, comprising:
   receiving a digital signal comprising a sequence of samples;
   calculating respective neighbor-based estimates for at least some of the samples,
      wherein a neighbor-based estimate for a sample is an estimate for an actual value of the sample,
      wherein the neighbor-based estimate is calculated over (i) one or more samples that precede the sample in the sequence and (ii) one or more samples that succeed the sample in the sequence, and
      wherein the neighbor-based estimate is calculated by applying a digital filter having a null coefficient at a position corresponding to the sample;
   calculating respective error values for the at least some of the samples, the respective error values being indicative of deviations of the respective neighbor-based estimates from respective actual values of the samples; and
   estimating an impairment in the digital signal based on the respective error values.

2. The method according to claim 1, wherein applying the digital filter comprises calculating a weighted average of the one or more samples that precede the sample in the sequence and the one or more samples that succeed the sample.

3. The method according to claim 1, wherein estimating the impairment comprises estimating a Direct Current (DC) offset by averaging the respective error values.

4. The method according to claim 1, wherein estimating the impairment comprises estimating a gain mismatch by averaging absolute-values of the respective error values.

5. The method according to claim 1, wherein estimating the impairment comprises estimating a timing skew based on the respective error values and on respective time-derivatives of the digital signal.

6. The method according to claim 5, wherein estimating the timing skew comprises one of:

averaging the respective error values multiplied by the respective time-derivatives of the digital signal;
   averaging the respective error values multiplied by respective signs of the time-derivatives of the digital signal;
   averaging respective signs of the respective error values multiplied by respective signs of the time-derivatives of the digital signal; and
   averaging respective signs of the respective error values multiplied by the respective time-derivatives of the digital signal.

7. The method according to claim 1, wherein the digital signal is produced by a Time-interleaved Analog-to-Digital Converter (TI-ADC) comprising multiple component-ADCs, and wherein estimating the impairment comprises estimating multiple impairments of the multiple component-ADCs.

8. The method according to claim 1, further comprising digitally correcting the digital signal to reduce the impairment.

9. The method according to claim 1, further comprising outputting a correction signal, and controlling an upstream component utilizing the correction signal to reduce the impairment.

10. The method according to claim 1, wherein estimating the impairment comprises estimating, for each of the respective error values, a respective frequency of the digital signal in a time interval containing an error value, and estimating the impairment based on the respective error values and respective frequencies.

11. A signal processing apparatus, comprising:
    an input interface configured to receive a digital signal comprising a sequence of samples; and
    an impairment estimator configured to:
       calculate respective neighbor-based estimates for at least some of the samples,
          wherein a neighbor-based estimate for a sample is an estimate for an actual value of the sample,
          wherein the neighbor-based estimate is calculated over (i) one or more samples that precede the sample in the sequence and (ii) one or more samples that succeed the sample in the sequence, and
          wherein the neighbor-based estimate is calculated by applying a digital filter having a null coefficient at a position corresponding to the sample;
       calculate respective error values for the at least some of the samples, the respective error values being indicative of deviations of the respective neighbor-based estimates from respective actual values of the samples; and
       estimate an impairment in the digital signal based on the respective error values.

12. The apparatus according to claim 11, wherein, in applying the digital filter, the impairment estimator is configured to calculate a weighted average of the one or more samples that precede the sample in the sequence and the one or more samples that succeed the sample.

13. The apparatus according to claim 11, wherein the impairment comprises a Direct Current (DC) offset, and wherein the impairment estimator is configured to estimate the DC offset by averaging the respective error values.

14. The apparatus according to claim 11, wherein the impairment comprises a gain mismatch, and wherein the impairment estimator is configured to estimate the gain mismatch by averaging absolute-values of the respective error values.

15. The apparatus according to claim 11, wherein the impairment comprises a timing skew, and wherein the impairment estimator is configured to estimate the timing skew based on the respective error values and on respective time-derivatives of the digital signal.

16. The apparatus according to claim 15, wherein the impairment estimator is configured to estimate the timing skew by performing one of:
- averaging the respective error values multiplied by the respective time-derivatives of the digital signal;
- averaging the respective error values multiplied by respective signs of the time-derivatives of the digital signal;
- averaging respective signs of the respective error values multiplied by respective signs of the time-derivatives of the digital signal; and
- averaging respective signs of the respective error values multiplied by the respective time-derivatives of the digital signal.

17. The apparatus according to claim 11, wherein the interface is configured to receive the digital signal from a Time-interleaved Analog-to-Digital Converter (TI-ADC) comprising multiple component-ADCs, and wherein the impairment estimator is configured to estimate the impairment by estimating multiple impairments of the multiple component-ADCs.

18. The apparatus according to claim 11, wherein the impairment estimator is configured to digitally correct the digital signal to reduce the impairment.

19. The apparatus according to claim 11, wherein the impairment estimator is configured to output a correction signal, and to control an upstream component utilizing the correction signal to reduce the impairment.

20. The apparatus according to claim 11, wherein the impairment estimator is configured to estimate, for each of the respective error values, a respective frequency of the digital signal in a time interval containing an error value, and to estimate the impairment based on the respective error values and respective frequencies.

* * * * *